United States Patent
Li et al.

(10) Patent No.: US 11,796,370 B2
(45) Date of Patent: Oct. 24, 2023

(54) VOLUME MEASUREMENT SYSTEM AND METHOD FOR CLOSED WATER-FILLED KARST CAVE

(71) Applicant: SHANDONG UNIVERSITY, Shandong (CN)

(72) Inventors: Shucai Li, Jinan (CN); Liping Li, Jinan (CN); Jing Wang, Jinan (CN); Shaoshuai Shi, Jinan (CN); Zongqing Zhou, Jinan (CN); Hongliang Liu, Jinan (CN); Xingzhi Ba, Jinan (CN); Shangqu Sun, Jinan (CN); Zhongdong Fang, Jinan (CN); Zhenhua Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 533 days.

(21) Appl. No.: 17/052,821

(22) PCT Filed: Apr. 11, 2019

(86) PCT No.: PCT/CN2019/082304
§ 371 (c)(1),
(2) Date: Nov. 4, 2020

(87) PCT Pub. No.: WO2020/062834
PCT Pub. Date: Apr. 2, 2020

(65) Prior Publication Data
US 2021/0223085 A1 Jul. 22, 2021

(30) Foreign Application Priority Data
Sep. 28, 2018 (CN) .......................... 201811140265.6

(51) Int. Cl.
*G01F 17/00* (2006.01)
*E21B 43/12* (2006.01)
*G01B 13/00* (2006.01)

(52) U.S. Cl.
CPC ............ *G01F 17/00* (2013.01); *E21B 43/126* (2013.01); *G01B 13/00* (2013.01)

(58) Field of Classification Search
CPC ...... G01F 17/00; E21B 43/126; E21B 47/003; G01B 13/00
See application file for complete search history.

(56) References Cited

U.S. PATENT DOCUMENTS 2,972,679 A    2/1961   Caldwell et al.

FOREIGN PATENT DOCUMENTS

| CN | 102607663 A | 7/2012 |
|----|-------------|--------|
| CN | 109000599 A | 12/2018 |

(Continued)

OTHER PUBLICATIONS

English Machine Translation of JP 2014029297 A, Feb. 13, 2014 (Year: 2014).*

(Continued)

*Primary Examiner* — David Z Huang
(74) *Attorney, Agent, or Firm* — Oliff PLC

(57) ABSTRACT

A volume measurement system and method for a closed water-filled karst cave, including a water collecting device, concentration tester and control system. The control system is connected to the water collecting device by a connecting piece. The water collecting device is a container with a top closed and bottom open. The water collecting device top is a piston. The piston is connected to a propulsion rod, and propulsion rod is controlled by control system to extend or retract, so as to realize the forward or backward movement of the piston. An openable and closeable placement table is (Continued)

hinged to the water collecting device's inner wall. The placement table is connected to piston, the placement table moves upward when piston is raised, and placement table moves downward when piston is lowered. The placement table is configured to accommodate a chemical substance. The concentration tester is configured to detect the solution's concentration.

12 Claims, 3 Drawing Sheets

(56) References Cited

FOREIGN PATENT DOCUMENTS

| | | | |
|---|---|---|---|
| JP | 2014029297 A | * | 2/2014 |
| SU | 958863 A1 | | 9/1982 |

OTHER PUBLICATIONS

Jul. 3, 2019 International Search Report issued in International Patent Application No. PCT/CN2019/082304.
Jul. 3, 2019 Written Opinion issued in International Patent Application No. PCT/CN2019/082304.

* cited by examiner

VOLUME MEASUREMENT SYSTEM AND METHOD FOR CLOSED WATER-FILLED KARST CAVE

BACKGROUND

Technical Field

The invention relates to the technical field of karst cave volume measurement in underground engineering, and particularly, to a volume measurement system and method for a closed water-filled karst cave.

Related Art

In recent years, tunnel engineering and subway construction are in full swing, and some engineering problems such as that tunnel excavation encounters a karst development area and there is a karst development area underneath the subway tunnel have also arisen one after another. Nowadays, it is no longer difficult to detect the position of the karst cave by geophysical methods, and fruitful achievements have been achieved. However, it is not enough to know only where the karst cave is, and it is also critical to obtain the volume of the karst cave. For such geological structures, filling materials (for example, concrete) are generally used for filling treatment in engineering. Only when the accurate volume of the karst cave is known, can corresponding engineering treatment measures be made to ensure that the karst development area can be passed through more smoothly, guaranteeing the safety of engineering construction. During practical construction, the construction organization cannot make a reasonable implementation plan without the accurate volume of the karst cave. Such an uncertainty results in the consumption of more manpower and material resources, increases costs and even causes the disorder of working procedures and the delay of the construction completion, which further shows that data related to the volume of the karst cave is quite critical to engineering construction and can provide an important reference for engineering. At present, there are various volume measurement methods. For example, a three-dimensional karst cave model is established by acquiring point cloud information inside the karst cave by means of three-dimensional laser scanning, and the volume of the karst cave is obtained by calculating the volume of the model. However, for this method, due to the poor penetration of the laser in water, the laser attenuates fast, that is, and will be attenuated fully before reaching the karst cave wall. In addition, the volume measurement using sonars is expensive. Therefore, how to devise a method for acquiring the volume of the karst cave quickly has become an urgent technical problem to be solved.

SUMMARY

A main objective of the invention is to solve the engineering application problems mentioned above, and provide a volume measurement system and method for a closed water-filled karst cave.

To achieve the above objective, the invention adopts the following technical solution:

A volume measurement system for a closed water-filled karst cave includes a water collecting device, a concentration tester and a control system. The control system is connected to the water collecting device by a connecting piece. The water collecting device is a container with a top closed and a bottom open. The top of the water collecting device is a piston. The piston is connected to a propulsion rod, and the propulsion rod is controlled by the control system to extend or retract, so as to realize the forward or backward movement of the piston. An openable and closeable placement table is hinged to an inner wall of the water collecting device. The placement table is connected to the piston, the placement table moves upward when the piston is raised, and the placement table moves downward when the piston is lowered. The placement table is configured to accommodate a chemical substance. The concentration tester is communicated with a lower part of the water collecting device, and is configured to detect the concentration of a solution.

Further, the water collecting device and the concentration tester are connected to the control system by the connecting piece, and the control system places the water collecting device and the concentration tester in a to-be-measured karst cave or takes the water collecting device and the concentration tester out of the to-be-measured karst cave by controlling the action of the connecting piece.

Further, the placement table is configured to accommodate the chemical substance, and the chemical substance falls into a cavity as the placement table is opened.

A method for measuring the volume of a closed water-filled karst cave by using the above device, including following steps:

step 1, cleaning a drill hole exposing the water-filled karst cave; and running a protective casing in the drill hole, and fixing the casing on the ground;

step 2, connecting a console to a water collecting device and a concentration tester through a connecting piece; placing chemical substance powder on a placement table in the water collecting device; fixing the console on the ground; and extending the water collecting device and the concentration tester into the karst cave along the casing;

step 3, when the instrument is lowered into the karst cave and submerged by water to a certain depth for easy extraction of test liquid, fixing the position of the instrument;

step 4, moving a propulsion rod downward through the ground console, so that a piston also moves downward, and here, the placement table is gradually opened along with the downward movement of the piston, the chemical substance powder, with the mass of m, inside the water collecting device falls into a water body in a cavity at the same time, and after a period of diffusion, the chemical substance powder is dissolved in the cavity and gradually diffuses;

step 5, controlling the piston to move upward through a control system, so that a solution in the cavity enters the collecting device;

step 6, communicating a container of the concentration tester for testing liquid with the inside of the water collecting device, so that when the water collecting device is filled with water, the solution enters the container of the concentration tester for testing liquid to complete the operation of extracting the solution once;

step 7, draining the liquid in the water collecting device and recollecting the liquid in the karst cave, performing concentration measurement on the collected liquid through the concentration tester multiple times and recording numerical values in sequence, taking an average value ρ of multiple measurements, and with the known mass m of the chemical substance, calculating the final volume V of the water-filled karst cave through a formula $$V = \frac{m}{\rho};$$

and step 8, completing the measurement work and withdrawing the instrument equipment to the ground.

Further, the chemical substance is a substance incapable of reacting with water or components in the air, such as sodium chloride and other substances meeting the conditions. It is easy to put it into water and it diffuses quickly in the liquid.

Further, when the instrument is immersed in water, the water collecting device at the bottommost of the system can supply and drain water freely. The water collecting device is configured to extract water in the karst cave for concentration measurement.

Further, the opening and closing of the bottom of the water collecting device is controlled on the ground. When the water collecting device is in a closed state, the measurement instrument can measure the concentration of the chemical substance in the extracted liquid.

Further, after the concentration value of the measured substance tends to be stable, the concentration tester records the numerical value automatically and issues a prompt, so as to ensure that the stable concentration of the substance can be acquired in the shortest time, which improves the efficiency greatly and saves time.

The beneficial effects of the invention are as follows:

Compared with the prior art, the volume measurement method for the closed water-filled karst cave of the invention can quickly acquire the volume information of the detection space accurately. The method strives to acquire the volume in a short time and with high precision, provides important reference for formulation of related measures in engineering, predetermines reasonable amount of materials, arranges the construction of each process scientifically and reasonably, and achieves the effect of guiding construction correctly.

BRIEF DESCRIPTION OF THE DRAWINGS

The drawings of description constituting a part of the application are used to provide further understanding of the application. Schematic embodiments and descriptions thereof are used to explain the application, and do not constitute improper limitation to the application.

Figure 1:
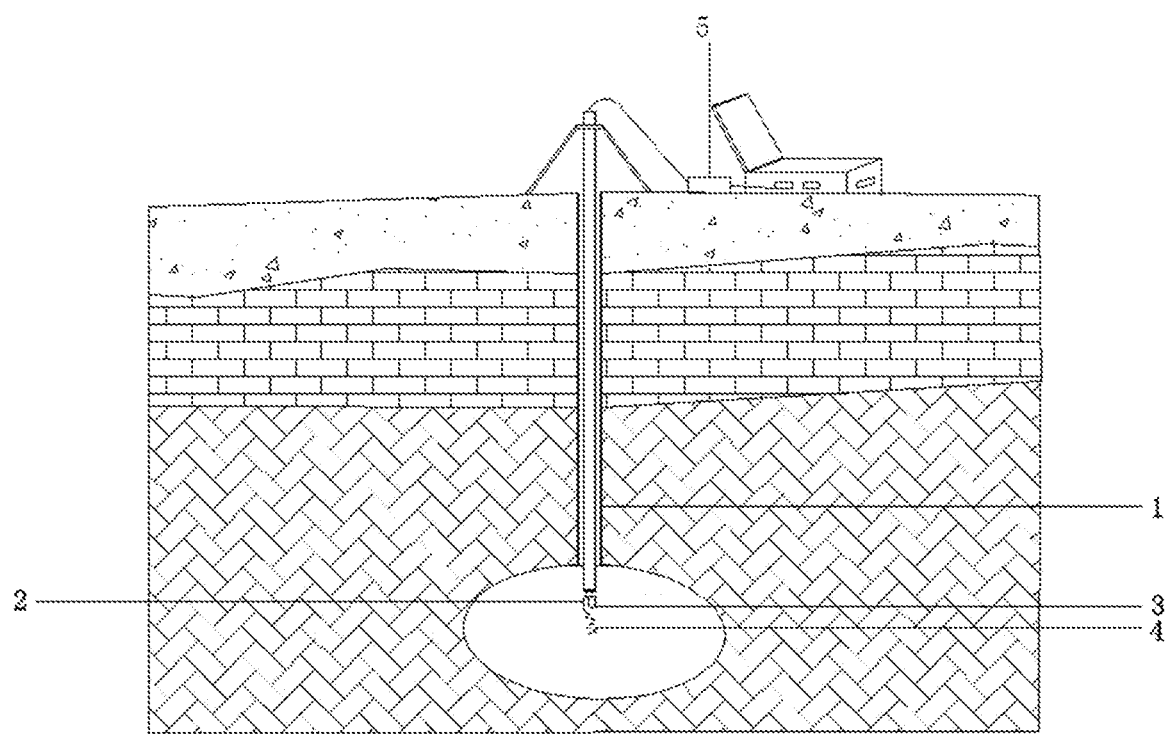
FIG. 1 is a schematic diagram of a volume measurement method for a closed water-filled karst cave of the invention.

In the drawings, 1—casing; 2—water collecting device; 3—concentration tester; 4—chemical substance; 5—control system; 6—propulsion rod; 7—piston; 8—connecting metal strip; and 9—placement table.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

For convenience of description, the words "above", and "below" only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present invention.

As introduced in the Related Art section, there are various volume measurement methods in the prior art. For example, a three-dimensional karst cave model is established by acquiring point cloud information inside the karst cave by means of three-dimensional laser scanning, and the volume of the karst cave is obtained by calculating the volume of the model. However, for this method, due to the poor penetration of the laser in water, the laser attenuates fast, that is, and will be attenuated fully before reaching the karst cave wall. In addition, the volume measurement using sonars is expensive. Therefore, how to devise a method for acquiring the volume of the karst cave quickly has become an urgent technical problem to be solved. In order to solve the above technical problem, the application provides a volume measurement system and method for a closed water-filled karst cave.

Figure 2:
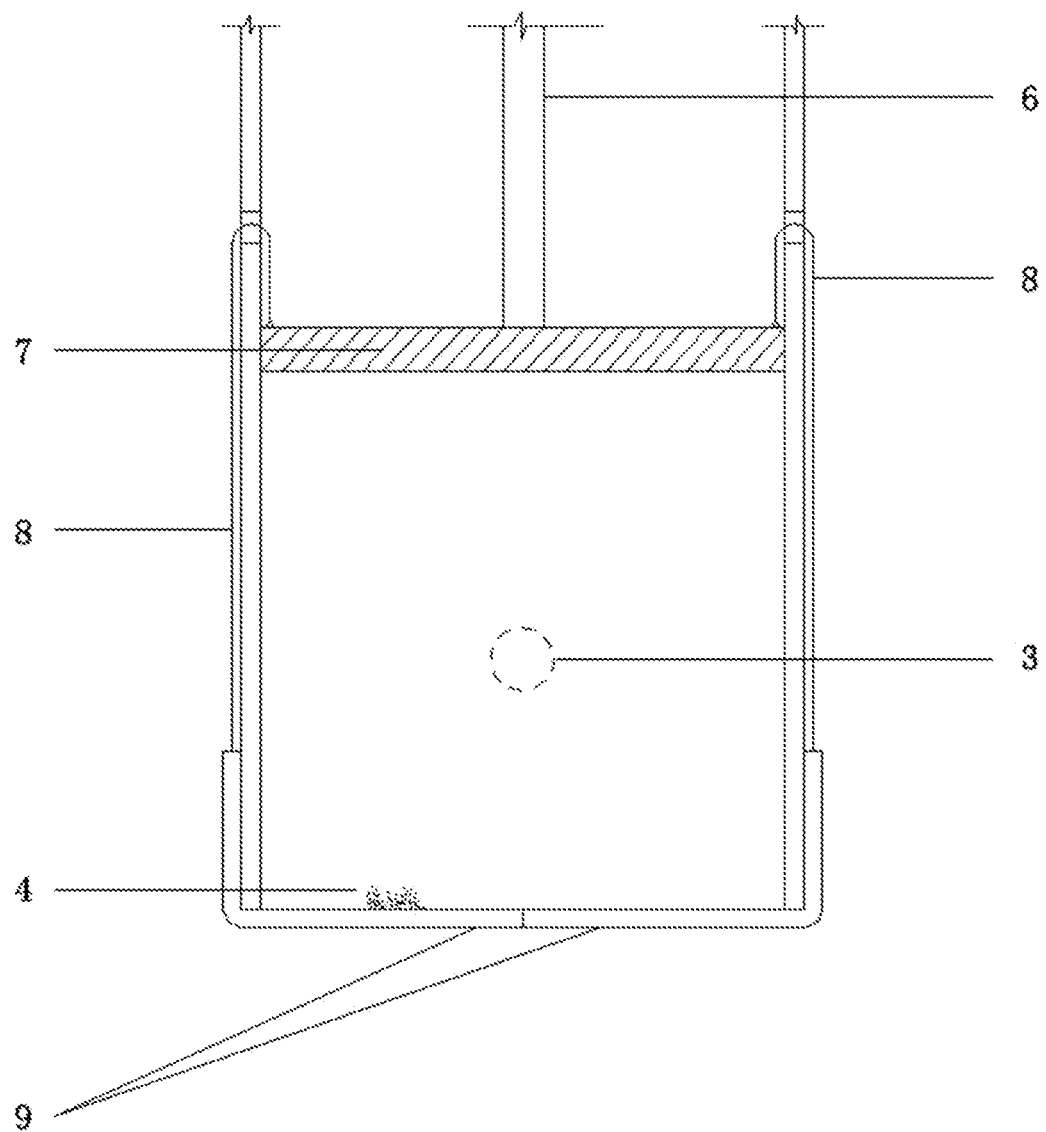
FIG. 2 is a front view of an underwater part of the invention.
Figure 3:
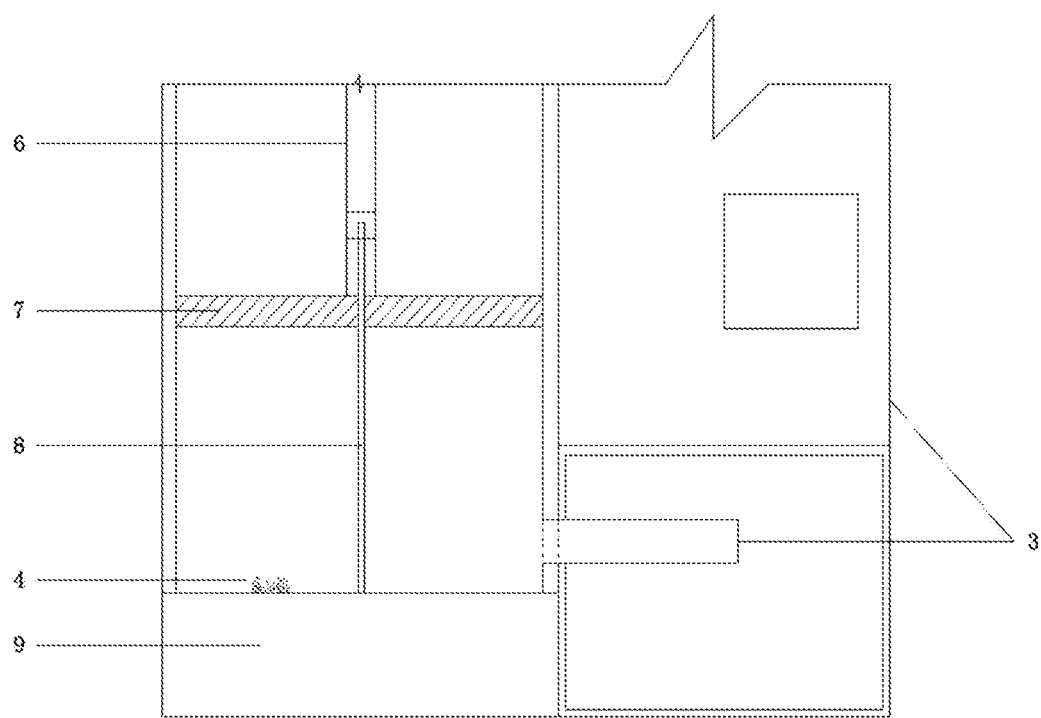
FIG. 3 is a side view of the underwater part of the invention.

Specifically, as shown in FIG. 1 to FIG. 3, the volume measurement system method for the closed water-filled karst cave includes a water collecting device 2, a concentration tester 3 and a control system 5. The control system 5 is connected to the water collecting device 2 by a connecting piece. The water collecting device 2 is a container with a top closed and a bottom open. The top of the water collecting device 2 is a piston. The piston 7 is connected to a propulsion rod, and the propulsion rod is controlled by the control system to extend or retract, so as to realize the forward or backward movement of the piston 7. An openable and closeable placement table is hinged to an inner wall of the water collecting device. The placement table 9 is connected to the piston 7 by a connecting metal strip 8, the placement table moves upward when the piston 7 is raised, and the placement table 9 moves downward when the piston 7 is lowered. The placement table 9 is configured to accommodate a chemical substance. The concentration tester is communicated with a lower part of the water collecting device 2, and is configured to detect the concentration of a solution.

The water collecting device 2 and the concentration tester 3 are connected to the control system 5 by the connecting piece, and the control system 5 places the water collecting device 2 and the concentration tester 3 in a to-be-measured karst cave or takes the water collecting device and the concentration tester out of the to-be-measured karst cave by controlling the action of the connecting piece. The connecting piece here may adopt a lifting device of a combination of a pulley and a steel wire rope. The steel wire rope is connected to the water collecting device 2 and the concentration tester 3. The water collecting device 2 and the concentration tester 3 are hoisted and lowered by controlling the steel wire rope.

The placement table 9 is configured to accommodate the chemical substance powder.

Specifically:

Step 1, a drill hole exposing the water-filled karst cave is cleaned. A protective casing is run in the drill hole, and the casing is fixed on the ground.

Step 2, a console is connected to the water collecting device and the concentration tester by the connecting piece. The water collecting device and the concentration tester are connected in a close fit manner. A container of the concentration tester for testing liquid is communicated with the inside of the water collecting device. It is convenient for collected liquid to be directly used for testing through this design. The console is fixed on the ground. The chemical substance powder, the water collecting device and the concentration tester are extended into the karst cave along the casing. The chemical substance powder falls into a cavity as a bottom cover is opened.

Step 3, when the instrument is lowered into the karst cave and submerged by water to a certain depth for easy extraction of test liquid, the position of the instrument is fixed.

Step 4, the propulsion rod is enabled to move downward through the ground console. At this moment, the connecting metal strip pulls the bottom cover of the water collecting device to move upward, the bottom cover is gradually opened, and the chemical substance powder inside the water collecting device falls into a water body in the cavity. After a period of diffusion, the chemical substance powder is dissolved in the cavity and gradually diffuses. In order to ensure that the chemical substance powder can be introduced into the cavity completely, the bottom cover may be shaken multiple times through the metal strip, and it should be ensured that the top surface of the placement table is smooth enough.

Step 5, the water collecting device performs water supply and drainage processes by mainly controlling the piston to move up and down. The piston is pulled actually by the propulsion rod. The propulsion rod is mechanically designed, and can be operated accurately by the ground console. In addition, the left and right of the top of the piston are connected to the bottom cover of the water collecting device by one connecting metal strip respectively. The bottom cover consists of two parts, and is in an open or closed state along with the downward or upward movement of the piston.

Step 6, the container of the concentration tester for testing liquid is communicated with the inside of the water collecting device. The container is arranged near the bottom cover of the water collecting device, so as to ensure that when the water collecting device is filled with water, water can enter the container naturally, thereby completing the operation of extracting water.

Step 7, after the chemical substance powder is put in, the piston is at the lowermost of the water collecting device, and there is no liquid in the water collecting device. At this moment, the propulsion rod may be withdrawn upward through the console, and at the same time, the connecting metal strips pull the bottom cover to gradually close and the piston to move upward, so as to enable the water collecting device to be filled with water. Since the concentration tester is communicated with the inside of the water collecting device, after test liquid collection is complete, the liquid in the water collecting device is drained and the liquid in the karst cave is recollected. Concentration measurement is performed on the collected liquid through the concentration tester three times and numerical values $\rho_1$, $\rho_2$, and $\rho_3$ are recorded in sequence. An average value $\rho$ of three measurements is taken. With the known mass m of the chemical substance, the final volume V of the water-filled karst cave is calculated through a formula. The calculation formula is as follows:

$$\rho = \frac{\rho_1 + \rho_2 + \rho_3}{3} \quad v = \frac{m}{\rho}$$

Step 8, the measurement work is completed and the instrument equipment is withdrawn to the ground.

The special chemical substance is a substance incapable of reacting with water or components in the air, such as sodium chloride. It is easy to put it into water and it diffuses quickly in the liquid. The concentration tester corresponding to sodium chloride may be instrument equipment for measuring salinity, but is not limited to salimeter, which depends on to-be-detected substances. In the present example, the concentration tester may be a conductivity salimeter for measuring seawater salinity. The equipment is simple in principle and convenient to operate, and can be configured to quickly determine the weight percentage concentration of a saline (sodium chloride) solution.

When the instrument is immersed in water, the water collecting device at the bottommost of the system can supply and drain water freely. The water collecting device is configured to extract water in the karst cave for concentration measurement.

The opening and closing of the bottom of the water collecting device is controlled on the ground. When the water collecting device is in a closed state, the measurement instrument can measure the concentration of the chemical substance in the extracted liquid.

After the concentration value of the measured substance tends to be stable, the concentration tester records the numerical value automatically and issues a prompt, so as to ensure that the stable concentration of the substance can be acquired in the shortest time, which improves the efficiency greatly and saves time.

It should be noted that the foregoing descriptions are intended to provide a further understanding of this application. The foregoing descriptions are merely preferred embodiments of the present invention, but are not intended to limit the present invention. Unless otherwise specified, all technical and scientific terms used herein have the same meaning as commonly understood by a person of ordinary skill in the art to which this application belongs.

What is claimed is:

1. A volume measurement system for a closed water-filled karst cave, comprising a water collecting device, a concentration tester and a control system, wherein the control system is connected to the water collecting device by a connecting piece, the water collecting device is a container with a top closed and a bottom open, the top of the water collecting device is a piston, the piston is connected to a propulsion rod, and the propulsion rod is controlled by the control system to extend or retract, so as to realize the forward or backward movement of the piston; an openable and closeable placement table is hinged to an inner wall of the water collecting device, the placement table is connected to the piston, the placement table moves upward when the piston is raised, and the placement table moves downward when the piston is lowered; the placement table is configured to accommodate a chemical substance; and the concentration tester is communicated with a lower part of the water collecting device, and is configured to detect the concentration of a solution.

2. The volume measurement system for a closed water-filled karst cave according to claim 1, wherein the control system places the water collecting device and the concentration tester in a to-be-measured karst cave or takes the water collecting device and the concentration tester out of the to-be-measured karst cave by controlling the action of the connecting piece.

3. The volume measurement system for a closed water-filled karst cave according to claim 1, wherein the placement table is configured to accommodate the chemical substance, and the chemical substance falls into a cavity as the placement table is opened.

4. A method for measuring the volume of a closed water-filled karst cave by using the system according to claim 1, comprising the following steps:

step 1, cleaning a drill hole exposing the water-filled karst cave; and running a protective casing in the drill hole, and fixing the casing on the ground;

step 2, connecting a console to a water collecting device and a concentration tester through a connecting piece; placing chemical substance powder on a placement table in the water collecting device; fixing the console on the ground; and extending the water collecting device and the concentration tester into the karst cave along the casing;

step 3, when the instrument is lowered into the karst cave and is submerged by water to a certain depth for easy extraction of test liquid, fixing the position of the instrument;

step 4, moving a propulsion rod downward through the ground console, so that a piston also moves downward, and here, the placement table is gradually opened along with the downward movement of the piston, the chemical substance powder, with the mass of m, inside the water collecting device falls into a water body in a cavity at the same time, and after a period of diffusion, the chemical substance powder is dissolved in the cavity and gradually diffuses;

step 5, controlling the piston to move upward through a control system, so that a solution in the cavity enters the collecting device;

step 6, communicating a container of the concentration tester for testing liquid with the inside of the water collecting device, so that when the water collecting device is filled with water, the solution enters the container of the concentration tester for testing liquid to complete the operation of extracting the solution once;

step 7, draining the liquid in the water collecting device and recollecting the liquid in the karst cave, performing concentration measurement on the collected liquid through the concentration tester multiple times and recording numerical values in sequence, taking an average value ρ of multiple measurements, and with the known mass m of the chemical substance, calculating the final volume V of the water-filled karst cave through a formula $$V = \frac{m}{\rho};$$

and step 8, completing the measurement work and withdrawing the instrument equipment to the ground.

5. The method according to claim 4, wherein the chemical substance is a substance incapable of reacting with water or components in the air, and the chemical substance is capable of diffusing quickly in the liquid when placed in water.

6. The method according to claim 4, wherein after the concentration value of the measured substance tends to be stable, the concentration tester records the numerical value automatically and issues a prompt.

7. A method for measuring the volume of a closed water-filled karst cave by using the system according to claim 2, comprising the following steps:

step 1, cleaning a drill hole exposing the water-filled karst cave; and running a protective casing in the drill hole, and fixing the casing on the ground;

step 2, connecting a console to a water collecting device and a concentration tester through a connecting piece; placing chemical substance powder on a placement table in the water collecting device; fixing the console on the ground; and extending the water collecting device and the concentration tester into the karst cave along the casing;

step 3, when the instrument is lowered into the karst cave and is submerged by water to a certain depth for easy extraction of test liquid, fixing the position of the instrument;

step 4, moving a propulsion rod downward through the ground console, so that a piston also moves downward, and here, the placement table is gradually opened along with the downward movement of the piston, the chemical substance powder, with the mass of m, inside the water collecting device falls into a water body in a cavity at the same time, and after a period of diffusion, the chemical substance powder is dissolved in the cavity and gradually diffuses;

step 5, controlling the piston to move upward through a control system, so that a solution in the cavity enters the collecting device;

step 6, communicating a container of the concentration tester for testing liquid with the inside of the water collecting device, so that when the water collecting device is filled with water, the solution enters the container of the concentration tester for testing liquid to complete the operation of extracting the solution once;

step 7, draining the liquid in the water collecting device and recollecting the liquid in the karst cave, performing concentration measurement on the collected liquid through the concentration tester multiple times and recording numerical values in sequence, taking an average value ρ of multiple measurements, and with the known mass m of the chemical substance, calculating the final volume V of the water-filled karst cave through a formula $$V = \frac{m}{\rho};$$

and step 8, completing the measurement work and withdrawing the instrument equipment to the ground.

8. A method for measuring the volume of a closed water-filled karst cave by using the system according to claim 3, comprising the following steps:
  step 1, cleaning a drill hole exposing the water-filled karst cave; and running a protective casing in the drill hole, and fixing the casing on the ground;
  step 2, connecting a console to a water collecting device and a concentration tester through a connecting piece; placing chemical substance powder on a placement table in the water collecting device; fixing the console on the ground; and extending the water collecting device and the concentration tester into the karst cave along the casing;
  step 3, when the instrument is lowered into the karst cave and is submerged by water to a certain depth for easy extraction of test liquid, fixing the position of the instrument;
  step 4, moving a propulsion rod downward through the ground console, so that a piston also moves downward, and here, the placement table is gradually opened along with the downward movement of the piston, the chemical substance powder, with the mass of m, inside the water collecting device falls into a water body in a cavity at the same time, and after a period of diffusion, the chemical substance powder is dissolved in the cavity and gradually diffuses;
  step 5, controlling the piston to move upward through a control system, so that a solution in the cavity enters the collecting device;
  step 6, communicating a container of the concentration tester for testing liquid with the inside of the water collecting device, so that when the water collecting device is filled with water, the solution enters the container of the concentration tester for testing liquid to complete the operation of extracting the solution once;
  step 7, draining the liquid in the water collecting device and recollecting the liquid in the karst cave, performing concentration measurement on the collected liquid through the concentration tester multiple times and recording numerical values in sequence, taking an average value ρ of multiple measurements, and with the known mass m of the chemical substance, calculating the final volume V of the water-filled karst cave through a formula $$V = \frac{m}{\rho};$$

and
  step 8, completing the measurement work and withdrawing the instrument equipment to the ground.

9. The method according to claim 7, wherein the chemical substance is a substance incapable of reacting with water or components in the air, and the chemical substance is capable of diffusing quickly in the liquid when placed in water.

10. The method according to claim 8, wherein the chemical substance is a substance incapable of reacting with water or components in the air, and the chemical substance is capable of diffusing quickly in the liquid when placed in water.

11. The method according to claim 7, wherein after the concentration value of the measured substance tends to be stable, the concentration tester records the numerical value automatically and issues a prompt.

12. The method according to claim 8, wherein after the concentration value of the measured substance tends to be stable, the concentration tester records the numerical value automatically and issues a prompt.

* * * * *